US012802200B2

(12) United States Patent
Zhuang

(10) Patent No.: US 12,802,200 B2
(45) Date of Patent: Nov. 17, 2026

(54) DUAL IN-LINE PACKAGE DEFECT IMAGE POST-PROCESSING SYSTEM COMBINING BILAYER OCCLUSION PERCEPTION AND SOFT NON-MAXIMUM SUPPRESSION AND METHOD THEREOF

(71) Applicants: SQ Technology (Shanghai) Corporation, Shanghai (CN); Inventec Corporation, Taipei City (TW)

(72) Inventor: Zi-Yue Zhuang, Shanghai (CN)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 170 days.

(21) Appl. No.: 19/024,615

(22) Filed: Jan. 16, 2025

(65) Prior Publication Data

US 2026/0148361 A1 May 28, 2026

(30) Foreign Application Priority Data

Nov. 27, 2024 (CN) ........................ 202411721048.1

(51) Int. Cl.
*G06T 7/00* (2017.01)
*G06V 10/25* (2022.01)
(Continued)

(52) U.S. Cl.
CPC ............ *G06T 7/0004* (2013.01); *G06V 10/25* (2022.01); *G06V 10/26* (2022.01); *G06V 10/82* (2022.01);
(Continued)

(58) Field of Classification Search
None
See application file for complete search history.

(56) References Cited

FOREIGN PATENT DOCUMENTS

CN 118521870 A * 2/2024 ............ G06N 3/084

OTHER PUBLICATIONS

Li et al., "Automatic Industry PCB Board DIP Process Defect Detection with Deep Ensemble Method", DOI: 10.1109/ISIE45063.2020.9152533, Publication Year: 2020 (Year: 2020).*

(Continued)

*Primary Examiner* — Chan S Park
*Assistant Examiner* — Promotto Tajrian Islam
(74) *Attorney, Agent, or Firm* — David R. Stevens; Stevens Law Group

(57) ABSTRACT

A dual in-line package defect image post-processing system combining bilayer occlusion perception and soft non-maximum suppression and a method thereof are disclosed. In the system, a bilayer convolutional network model models a defect region of a dual in-line package image as a top layer and a bottom layer overlapped with each other, detects an occlusion part and infers an occluded part to output masks and detection boxes. Each of the masks and the detection boxes is filtered based on an area size. A soft non-maximum suppression calculation is executed to output the detection box having high confidence and low intersection over union. A polygon approximation process is executed to obtain simplified polygonal masks. The simplified polygonal masks, the detection box having high confidence and low intersection over union, and the dual in-line package image are displayed, thereby achieving the technical effect of improving the flexibility and accuracy of defect inspection.

10 Claims, 5 Drawing Sheets

(51) Int. Cl.
*G06V 10/26* (2022.01)
*G06V 10/82* (2022.01)

(52) U.S. Cl.
CPC ............... *G06T 2207/20084* (2013.01); *G06T 2207/30148* (2013.01)

(56) References Cited

OTHER PUBLICATIONS

Mao et al., “Automated Defect Detection for Mass-Produced Electronic Components Based on YOLO Object Detection Models”, DOI: 10.48550/arXiv.2510.01914, Publication Year: 2025 (Year: 2025).*

Ke et al., “Occlusion-Aware Instance Segmentation via BiLayer Network Architectures”, DOI: 10.48550/arXiv.2208.04438, Publication Year: 2023 (Year: 2023).*

Dai et al., “Instance-aware Semantic Segmentation via Multi-task Network Cascades”, DOI: 10.48550/arXiv.1512.04412, Publication Year: 2015 (Year: 2015).*

Litto et al., “Real-Time Instance Segmentation with Polygons Using an Intersection-Over-Union Loss”, DOI: 10.1109/CRV60082.2023.00027, Publication Year: 2023 (Year: 2023).*

* cited by examiner

DUAL IN-LINE PACKAGE DEFECT IMAGE POST-PROCESSING SYSTEM COMBINING BILAYER OCCLUSION PERCEPTION AND SOFT NON-MAXIMUM SUPPRESSION AND METHOD THEREOF

CROSS-REFERENCE TO RELATED APPLICATION

This application claims the benefit of Chinese Application Serial No. 2024117210481, filed Nov. 27, 2024, which is hereby incorporated herein by reference in its entirety.

BACKGROUND OF THE INVENTION

1. Field of the Invention

The present invention relates to a post-processing system and a method thereof, and more particularly to a dual in-line package defect image post-processing system combining bilayer occlusion perception and soft non-maximum suppression and a method thereof.

2. Description of the Related Art

In recent years, with the widespread use and rapid development of integrated circuits, various integrated circuit components have emerged. However, defects often occur during the manufacturing process of integrated circuit components, so how to flexibly and accurately identify defects has become one of the urgent problems for manufacturers to solve.

Dual in-line package (DIP) is a common integrated circuit packaging technology that features multiple pins arranged in parallel and is widely used in various electronic devices. The existing DIP defect inspection method relies on bounding box inspection technology for targets, but there are limitations in practical inspect and subsequent processing, for example, a target inspection algorithm requires frequent parameter adjustments to adapt to different detection environments and requirements, and it greatly increases maintenance costs. Furthermore, the bounding box inspection technology does not have enough accuracy in multi-target scenarios and complex backgrounds, especially when there is overlap or occlusion between targets. Additionally, the bounding box lacks flexibility in performing complex analyses, such as measuring precise defect areas or shape features. Therefore, the existing bounding box inspection technology has poor flexibility and accuracy in defect inspection.

According to above-mentioned contents, what is needed is to develop an improved solution to solve the conventional problem of poor flexibility and accuracy in defect inspection.

SUMMARY OF THE INVENTION

An objective of the present invention is to disclose a dual in-line package defect image post-processing system combining bilayer occlusion perception and soft non-maximum suppression and a method thereof, to solve the conventional problem of poor flexibility and accuracy in defect inspection.

To achieve the objective, the present invention discloses a dual in-line package defect image post-processing system combining bilayer occlusion perception and soft non-maximum suppression, and the dual in-line package defect image post-processing system includes an image sensor, an occlusion detection module, a filter module, a calculation module, an adjusting module and an output module. The image sensor is configured to capture an image of a dual in-line package (DIP) component to generate a DIP image. The occlusion detection module is connected to the image sensor, configured to receive a DIP image, input the dual in-line package image into a bilayer convolutional network model to model a defect region of the dual in-line package image as a top layer and a bottom layer overlapped with each other, wherein the bilayer convolutional network model detects an occlusion part based on the top layer, infers an occluded part based on the bottom layer, and outputs masks and detection boxes. The filter module is connected to the occlusion detection module, configured to calculate an area of each of the masks and the detection boxes and delete at least one of the masks and the detection boxes having an area not meeting an area filter threshold. The calculation module is connected to the filter module, configured to execute a soft non-maximum suppression calculation to calculate an intersection over union (IoU) of one of the detection boxes and another of the detection boxes, and smoothly attenuate a confidence of the overlapped one and another of the detection boxes based on the calculated IoU. The adjusting module is connected to the calculation module, configured to sort the detection boxes based on the confidences, select the detection box having the highest confidence as a basic box, compare the basic box with the remaining ones of the detection boxes and calculate the IoUs one by one, dynamically adjust the confidences based on the calculated IoUs, and output the detection box having high confidence and low IoU, wherein the attenuation of the IoU and the confidence are negatively correlated. The output module is connected to the adjusting module, configured to execute a polygon approximation process on the masks to obtain simplified polygonal masks, and display the simplified polygonal masks, the detection box having high confidence and low intersection over union, and the dual in-line package image.

To achieve the objective, the present invention discloses a dual in-line package defect image post-processing method combining bilayer occlusion perception and soft non-maximum suppression, include steps of: receiving a dual in-line package image from an image sensor, and inputting the dual in-line package image into a bilayer convolutional network model to model a defect region of dual in-line package image as a top layer and a bottom layer overlapped with each other, wherein the bilayer convolutional network model detects an occlusion part based on the top layer, infer an occluded part based on the bottom layer, and outputs masks and detection boxes; calculating an area of each of the masks and the detection boxes, and deleting one of the masks and the detection boxes that has the area not meeting an area filter threshold; executing a soft non-maximum suppression calculation to calculate an intersection over union (IoU) of one of the detection boxes and another of the detection boxes and smoothly attenuate a confidence of the overlapped one and another of the detection boxes based on the calculated IoU; sorting the detection boxes based on the confidences, selecting one of the detection boxes having highest confidence as a basic box, comparing the basic box with the remaining ones of the detection boxes and calculate the IoUs one by one, dynamically adjusting the confidences based on the calculated IoUs, and outputting the detection box having high confidence and low IoU, wherein attenuation of the IoU and the confidence are negatively correlated; executing a polygon approximation process on the masks to obtain a simplified polygonal mask, and displaying the simplified polygonal mask, the detection box having high confidence and low intersection over union, and the dual in-line package image.

According to the system and method of the present invention, the difference between the present invention and the conventional technology is that, in the present invention, the bilayer convolutional network model models the defect region of the dual in-line package image as the top layer and the bottom layer overlapped with each other, detects the occlusion part and infers the occluded part to output masks and detection boxes; each of the masks and the detection boxes is filtered based on the area size; the soft non-maximum suppression calculation is executed to output the detection box having high confidence and low intersection over union; the polygon approximation process is executed to obtain the simplified polygonal masks; the simplified polygonal masks, the detection box having high confidence and low intersection over union, and the dual in-line package image are displayed.

Therefore, the above-mentioned solution of the present invention can achieve the technical effect of improving the flexibility and accuracy of defect inspection.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
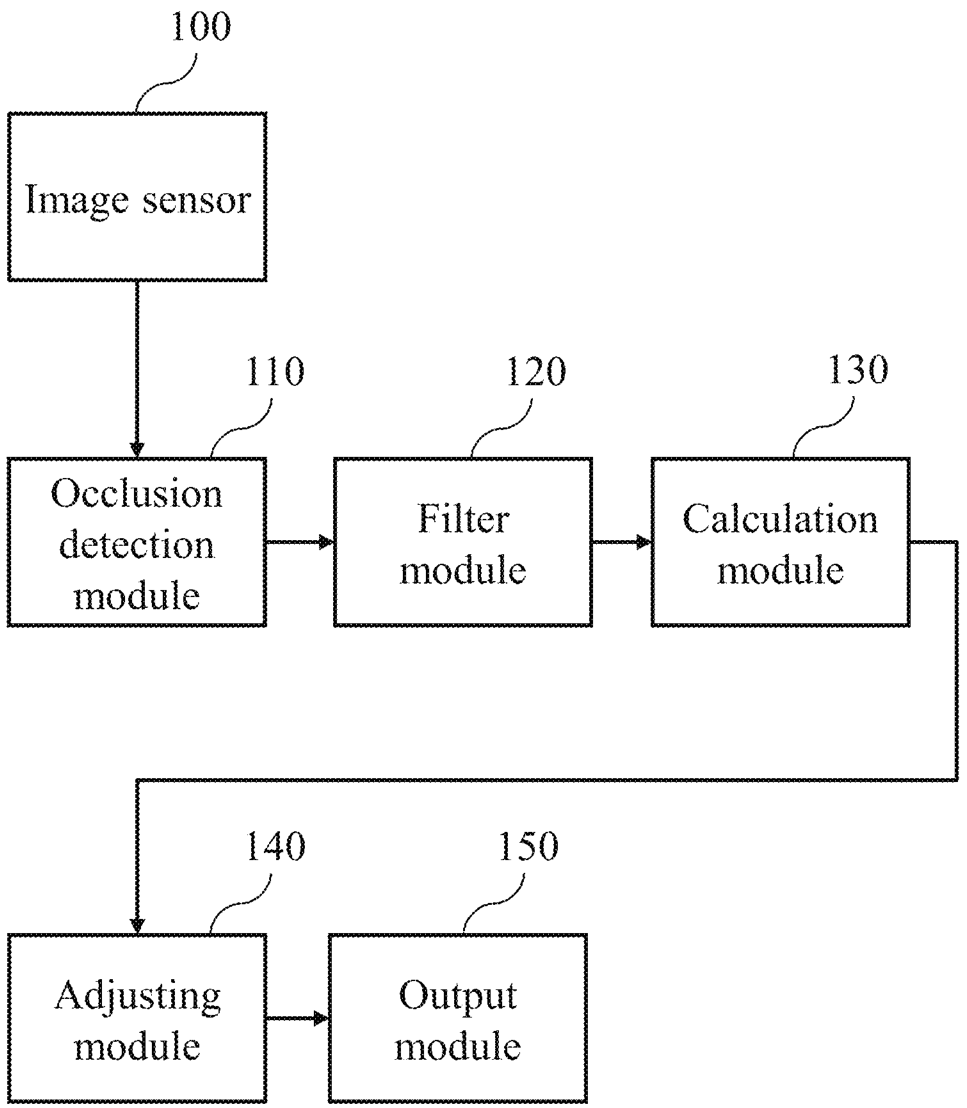
FIG. 1 is a diagram of a dual in-line package defect image post-processing system combining bilayer occlusion perception and soft non-maximum suppression, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms “a”, “an” and “the” are intended to include the plural forms as well, unless the context clearly indicates otherwise. As used herein, the term “or” includes any and all combinations of one or more of the associated listed items.

It will be acknowledged that when an element or layer is referred to as being “on”, “connected to” or “coupled to” another element or layer, it can be directly on, connected or coupled to the other element or layer, or intervening elements or layers may be present. In contrast, when an element is referred to as being “directly on”, “directly connected to” or “directly coupled to” another element or layer, there are no intervening elements or layers present.

In addition, unless explicitly described to the contrary, the words “comprise” and “include”, and variations such as “comprises”, “comprising”, “includes”, or “including”, will be acknowledged to imply the inclusion of stated elements but not the exclusion of any other elements.

Please refer to FIG. 1. FIG. 1 is a diagram of a dual in-line package defect image post-processing system combining bilayer occlusion perception and soft non-maximum suppression, according to the present invention. The dual in-line package defect image post-processing system includes an image sensor 100, an occlusion detection module 110, a filter module 120, a calculation module 130, an adjusting module 140 and an output module 150. The image sensor 100 is configured to capture an image of a DIP component to generate a DIP image. In one implementation, the image sensor 100 can be implemented by a charge-coupled device (CCD), complementary metal-oxide-semiconductor (CMOS), Foveon X3, or indium gallium arsenide (InGaAs) sensor.

The occlusion detection module 110 is connected to the image sensor 100, configured to receive the DIP image, input the DIP image into a bilayer convolutional network model (hereinafter referred to as BCNet model), and model a defect region of the DIP image as a top layer and a bottom layer overlapped with each other. The BCNet model can detect an occlusion part based on the top layer, infer an occluded part based on the bottom layer, and output masks and detection boxes. The difference between the detection box and the bounding box is that the detection box is generated by the BCNet model and the bounding box is generated through a conventional target inspection algorithm. In actual implementation, the BCNet model is a type of neural network based on deep learning and capable of processing masks and detection boxes of multiple targets while considering the occlusion relationships between targets.

The filter module 120 is connected to the occlusion detection module 110, and configured to calculate an area of each of the masks and detection boxes, and delete one of the masks and the detection boxes that has an area not meeting an area filter threshold. For example, the area filter threshold can initially be set to a quantity value of pixels, such as 200 pixels, so the mask or the detection box having an area meeting 200 pixels is retained, and the mask or the detection box having an area not meeting 200 pixels is deleted. In actual implementation, the area filter threshold can also be dynamically adjusted. For example, the pixel value can be dynamically adjusted based on a total quantity of detection box, and the total quantity is positively correlated to the pixel value. In other words, as the quantity of the detection boxes increases, the standard for filtering the mask and the detection box also increases.

The calculation module 130 is connected to the filter module 120 and configured to perform a soft non-maximum suppression (hereinafter referred to as Soft NMS) calculation to calculate an intersection over union of one of the detection boxes and another of the detection boxes, and smoothly attenuate a confidence of the overlapped one and another of the detection boxes based on the intersection over union. For example, assuming the matrix of the first detection box is $$\begin{matrix} 1 & 1 & 0 \\ 1 & 1 & 0, \\ 0 & 0 & 0 \end{matrix}$$

and the matrix of the second detection box is $$\begin{matrix} 1 & 0 & 1 \\ 1 & 1 & 0, \\ 0 & 0 & 0 \end{matrix}$$

where a value of 1 represents that a pixel is part of the mask, and a value of 0 represents that a pixel is not part of the mask, then the overlapping area consists of 3 pixels (that is, 3 positions where the values are 1 in both matrices), and the union area consists of 5 pixels (that is, 5 positions where the values are not 0 in either matrix). At this point, the calculation for the intersection over union is 3/5=0.6.

The adjusting module 140 is connected to the calculation module 130, and configured to sort the detection boxes based on the confidences and select one of the detection boxes having a highest confidence as a basic box, and then compare the basic box with the remaining detection boxes and calculate the intersection over union, step by step. The adjusting module 140 dynamically adjusts the confidence based on the calculated intersection over union, and outputs the detection box having high confidence and low intersection over union. The attenuation of the intersection over union and the confidence are negatively correlated. In actual implementation, the calculation for the confidence can be performed using the formula:

$$\text{score}_j = \text{score}_i \times e^{-\frac{IoU^2}{\sigma}},$$

where $\text{score}_j$ is the adjusted confidence of detection box, $\text{score}_i$ is the confidence of the detection box before adjustment (or the $\text{score}_i$ is the initial confidence at the initial stage), IoU is the intersection over union of the detection box and the basic box, and $\sigma$ is the adjusting coefficient, which controls the attenuation strength. For example, in a condition that the initial confidence is 0.9, IoU is 0.6, $\sigma$ is a 0.5, then the calculated confidence is 0.438.

The output module 150 is connected to the adjusting module 140, configured to execute a polygon approximation process on the masks to obtain a simplified polygonal mask, and display the simplified polygonal mask, the detection box having high confidence and low intersection over union, and the dual in-line package image together. In actual implementation, the polygon approximation process includes operations of initializing a tolerance, setting a point range, performing an increment on the tolerance when quantity of polygon vertices of the mask exceed a point range, and when the quantity of polygon vertices of the mask do not exceed the point range, performing a decrement on the tolerance when the quantity of polygon vertices of the mask does not exceed the point range, and generating the simplified polygonal mask whose quantity of polygon vertices is within the point range. For example, the tolerance can be a value of 0.1 initially, increased by 0.1 for each increment, and decreased by 0.1 for each decrement. The point range is between 20 to 30 for a polygon having 20~30 vertices. It is to further explain that, during the polygon approximation process, boundary points are used to generate the polygon and insignificant boundary vertices are removed based on the set tolerance, to make the polygon simpler. For example, when there are 4 boundary points (0, 0), (0, 1), (1, 0) and (1, 1), (0, 1) and (1, 0) can be deleted and only (0, 0) and (1, 1) are retained to form the smallest bounding quadrilateral; in other words, only the two diagonal points are needed to reconstruct the complete rectangle through calculation; the need to retain all four points is eliminated, thereby effectively reducing the computational cost of image processing and storage resources. Furthermore, the generated polygon can be checked to determine whether the vertices meet the preset condition, such as whether the vertices are within the tolerance range and form a closed polygon. For example, when the tolerance range is set as 0.1, and a vertex (1,1) deviates significantly from the boundary, adjustments or additional vertices are needed to ensure the polygon conforms to the true boundary of the defect or occlusion.

It is to be particularly noted that, in actual implementation, the above-mentioned modules of the present invention can be implemented fully or partly based on hardware, for example, the hardware processor can be implemented by integrated circuit chip, system on chip (SoC), a complex programmable logic device (CPLD), or a field programmable gate array (FPGA). The data mentioned in the present invention can be stored in a non-transitory computer-readable storage medium, and the non-transitory computer-readable storage medium can record computer readable program instructions, and the hardware processor can execute the computer readable program instructions to implement concepts of the present invention. The non-transitory computer-readable storage medium can be a tangible apparatus for holding and storing the instructions executable of an instruction executing apparatus. The non-transitory computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the non-transitory computer-readable storage medium can include a hard disk, an RAM memory, a read-only-memory, a flash memory, an optical disk, a floppy disc, or any appropriate combination thereof, but this exemplary list is not an exhaustive list. The non-transitory computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network and forward the computer readable program instruction to store in non-transitory computer-readable storage medium of each calculating/processing apparatus. In actual implementation, the present invention can be implemented in environment where a computer host is connected to a database. The computer host can include a non-transitory computer-readable storage medium and a hardware processor. The non-transitory computer-readable storage medium stores computer readable program instructions, and multiple-time-series model having time-series models. The computer host can execute the computer readable program instructions. The computer readable program instructions can be assembly language instructions, instruction-set-structure instructions, machine instructions, machine-related Instructions, micro-instructions, firmware instructions, or source codes or object codes written in any combination of one or more programming languages. The programming language includes object-oriented programming languages, such as: Common Lisp, Python, C++, Objective-C, Smalltalk, Delphi, Java, Swift, C#, Perl, Ruby, or PHP; the programming language can include regular procedural programming languages, such as C language or similar programming languages. The hardware processor is electrically connected to the non-transitory computer-readable storage medium and configured to execute the computer readable program instructions.

Figure 2A:
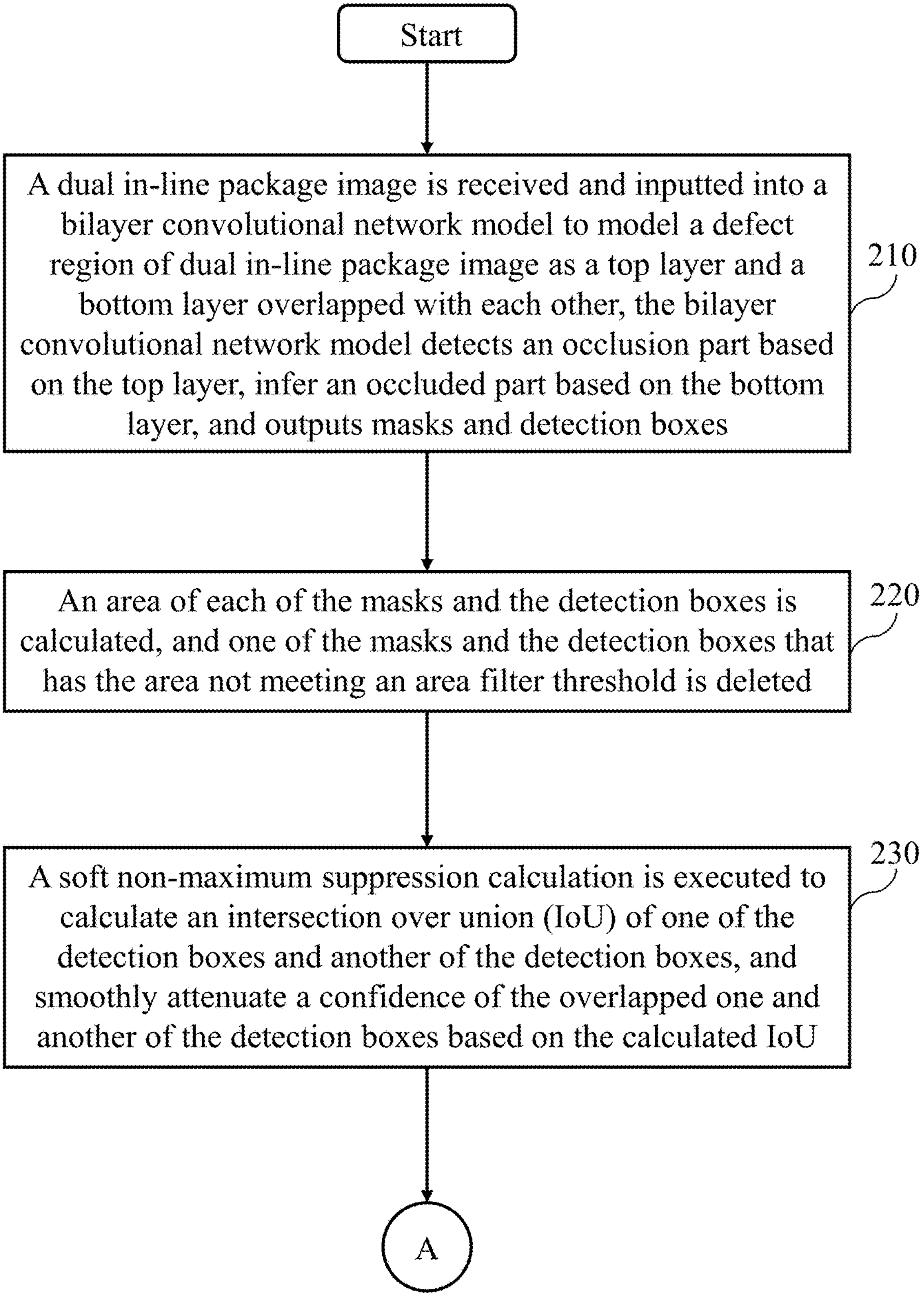
FIG. 2A and FIG. 2B are flowcharts of dual in-line package defect image post-processing method combining bilayer occlusion perception and soft non-maximum suppression, according to the present invention.
Figure 2B:
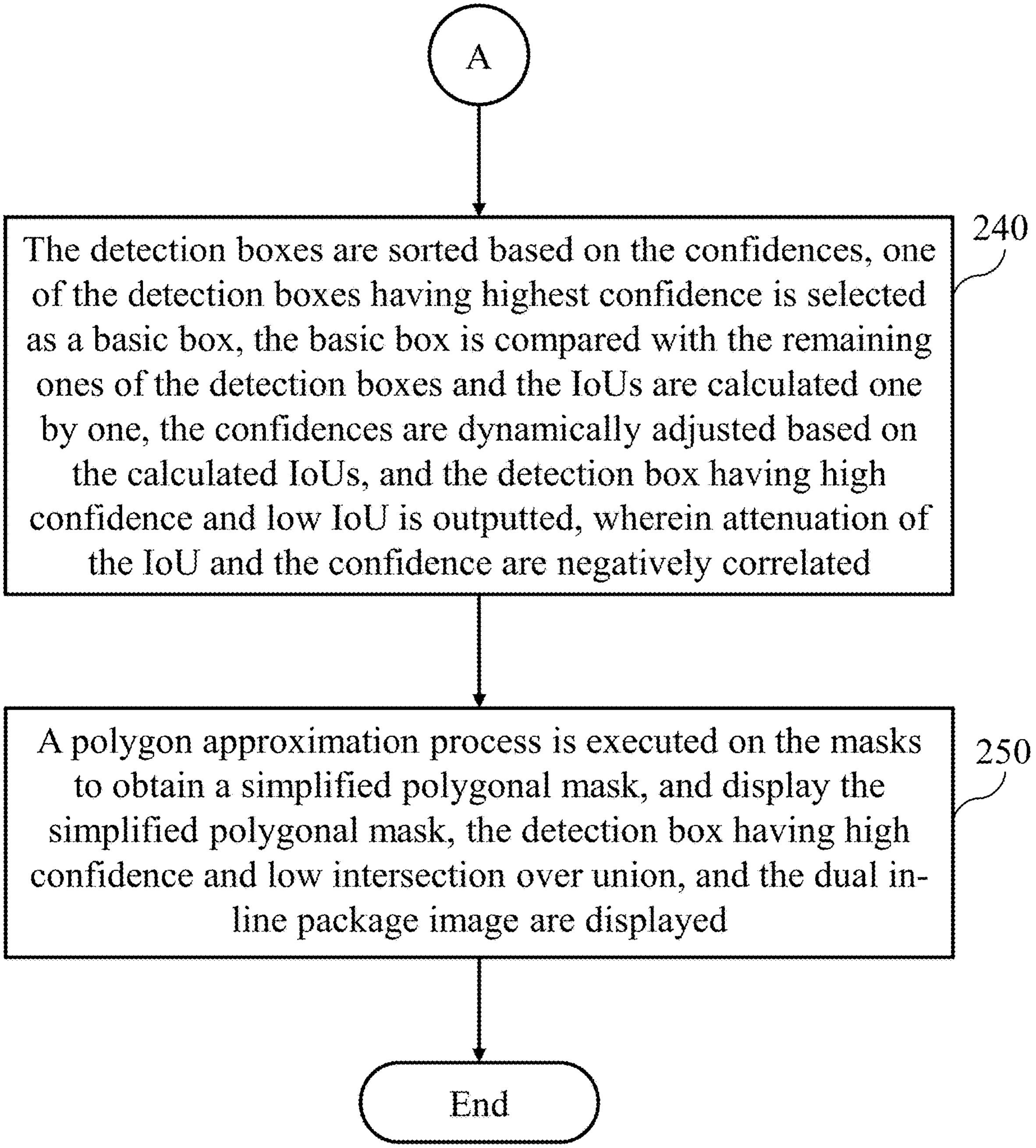

Please refer to FIG. 2A and FIG. 2B. FIG. 2A and FIG. 2B are flowcharts of a dual in-line package defect image post-processing method combining bilayer occlusion perception and soft non-maximum suppression, according to the present invention. As shown in FIG. 2A and FIG. 2B, the dual in-line package defect image post-processing method includes the following steps. In a step 210, a dual in-line package image is received and inputted into a bilayer convolutional network model to model a defect region of a dual in-line package image as a top layer and a bottom layer overlapped with each other, the bilayer convolutional network model detects an occlusion part based on the top layer, infers an occluded part based on the bottom layer, and outputs one or more masks and one or more detection boxes. In a step 220, an area of each of the masks and the detection boxes is calculated, and one of the masks and the detection boxes that has the area not meeting an area filter threshold is deleted. In a step 230, a soft non-maximum suppression calculation is executed to calculate an intersection over union (IoU) of one of the detection boxes and another of the detection boxes, and smoothly attenuate a confidence of the overlapped one and another of the detection boxes based on the calculated IoU. In a step 240, the detection boxes are sorted based on the confidences. One of the detection boxes having highest confidence is selected as a basic box. The basic box is compared with the remaining detection boxes and the IoUs are calculated one by one. The confidences are dynamically adjusted based on the calculated IoUs, and the detection box having high confidence and low IoU is outputted, wherein attenuation of the IoU and the confidence are negatively correlated. In a step 250, a polygon approximation process is executed on the masks to obtain a simplified polygonal mask, and display the simplified polygonal mask, the detection box having high confidence and low intersection over union, and the dual in-line package image are displayed. Through aforementioned steps, the bilayer convolutional network model models the defect region of the dual in-line package image as the top layer and the bottom layer overlapped with each other, detects the occlusion part and infers the occluded part to output masks and detection boxes; each of the masks and the detection boxes is filtered based on the area size; the soft non-maximum suppression calculation is executed to output the detection box having high confidence and low intersection over union; the polygon approximation process is executed to obtain the simplified polygonal masks; the simplified polygonal masks, the detection box having high confidence and low intersection over union, and the dual in-line package image can be displayed.

Figure 3:
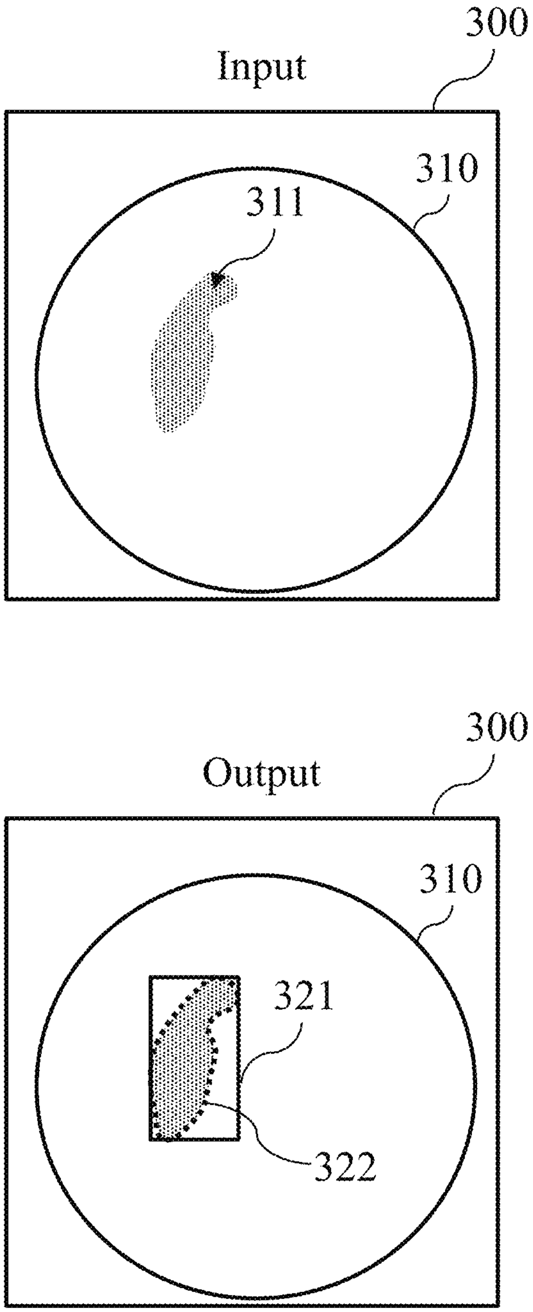
FIG. 3 is a schematic view of post processing for dual in-line package defect image, according to an application of the present invention.

An embodiment of the present invention will be illustrated in the following paragraphs with reference to FIG. 3 and FIG. 4. Please refer to FIG. 3. FIG. 3 is a schematic view of a post processing for a dual in-line package defect image, according to an application of the present invention. In a condition that a dual in-line package image 300 has a component 310 with a defect region 311, which is represented by black dotted patterns in FIG. 3. In this case, the dual in-line package image 300 is inputted into a BCNet model, the BCNet model models a top layer and a bottom layer, detects the occlusion part and infers the occluded part, so that the BCNet model can output the corresponding mask and detection box. Subsequently, based on an area filtering threshold, such as 200 pixels, the mask or the detection box having the area not meeting the area filter threshold is removed. The Soft NMS calculation is executed to compute an intersection over union between the remaining detection boxes, and smoothly attenuate a confidence of the overlapped detection boxes based on the intersection over union. In actual implementation, the confidence can be attenuated through linear attenuation, Gaussian attenuation, exponential attenuation, or similar formulas. The confidences of the detection boxes are sorted to select the detection box with the highest confidence as basic box, and the basic box is compared with the remaining detection boxes and the IoUs thereof are calculated one by one, and the confidences are dynamically adjusted based on the calculated IoUs, the confidence of overlapping detection boxes are adjusted based on the intersection over union using the aforementioned smoothing attenuation method. The detection box 321 having high confidence and low intersection over union is outputted. Furthermore, the polygon approximation process is performed on the masks output by the BCNet model to obtain the simplified polygonal mask 322, as shown in FIG. 3 (represented by dashed lines). As shown in FIG. 3, the detection box 321 and the simplified polygonal mask 322 are displayed at the corresponding defect region 311 on the component 310 in the dual in-line package image 300. Thus, the application of the BCNet model for DIP defect segmentation is completed to replace the conventional bounding box inspection method, thereby achieving precise segmentation of the defect region 311 even in complex backgrounds and multiple-target scenarios to provide precise area and shape feature analysis, reducing misjudgment or missed inspections, improving detection efficiency and reliability, and enabling applications in automated quality inspection on large-scale production lines to meet industrial demands for high precision and low maintenance costs.

Figure 4:
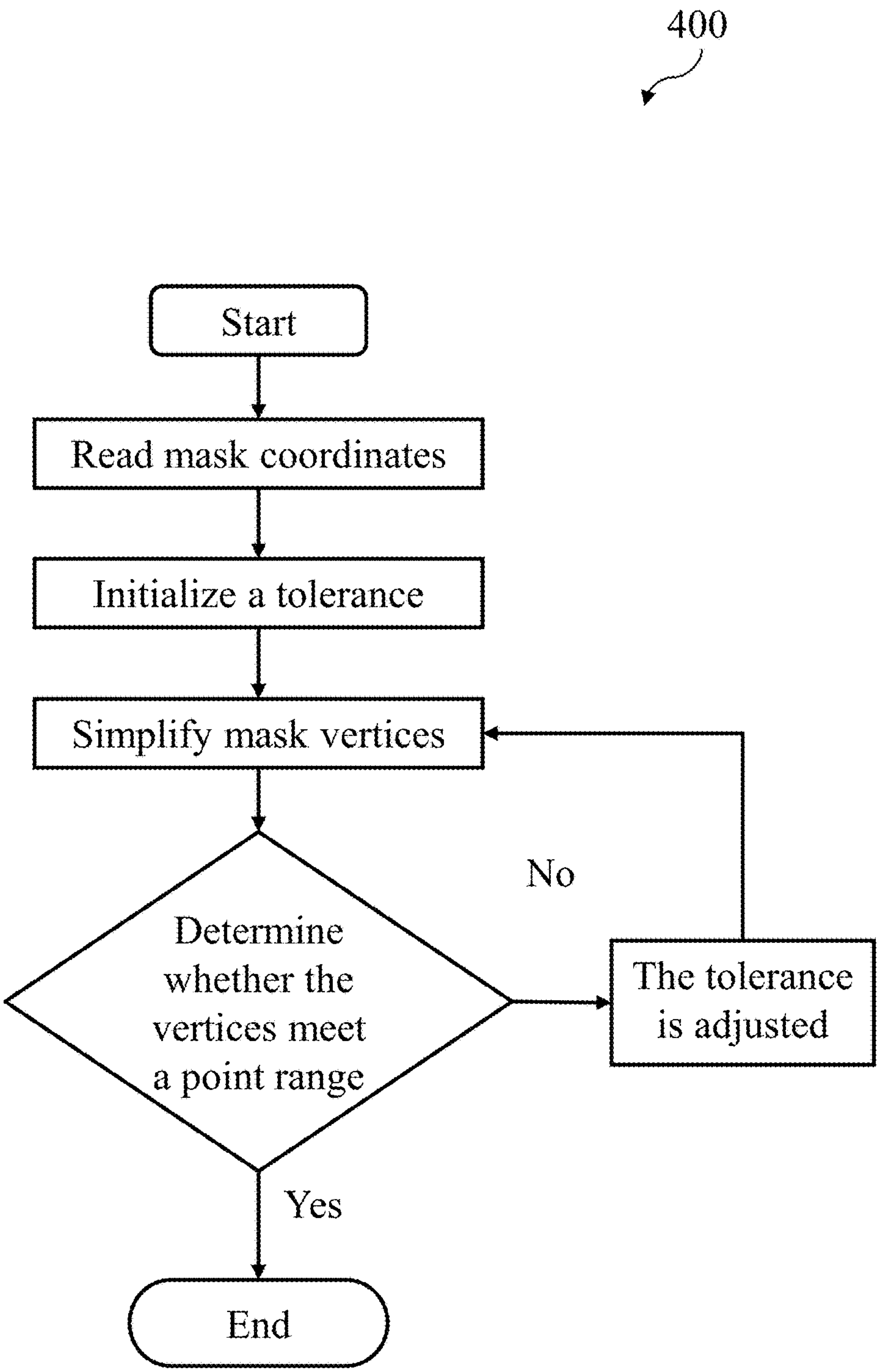
FIG. 4 is a schematic view of executing polygon approximation process, according to an application of the present invention.

Please refer to FIG. 4. FIG. 4 is a schematic view of a polygon approximation process, according to an application of the present invention. In actual implementation, the flow 400 of the polygon approximation process includes steps of reading mask coordinates, initializing a tolerance, simplifying mask vertices, and determining whether the vertices meet a point range. When the vertices meet the point range, the polygon approximation process is completed; otherwise, the tolerance is adjusted, and the process returns to the step of simplifying the mask vertices. For example, there is a 3×3 mask matrix $$\begin{matrix} 1 & 1 & 0 \\ 1 & 1 & 0, \\ 0 & 0 & 0 \end{matrix}$$

where each matrix element represents the occlusion status of a pixel, for example, the pixel with a value of 1 indicates that it is a part of the mask and occluded, and the pixel with 0 indicates it is not part of the mask. Thus, when the mask coordinate is read, four coordinate points (0, 0), (0, 1), (1, 0) and (1, 1) can be identified as the region recognized as a target (e.g., a defect). Subsequently, during the initialization of the tolerance, the tolerance can be set to a value of 0.1, representing the allowable deviation of vertices from the edges within 0.1 units for smoother boundary approximation. While mask vertices are simplified, insignificant boundary vertices are removed based on the set tolerance, to make the polygon simpler. The four coordinate points are taken as an example, (0, 1) and (1, 0) can be removed and only the two diagonal points are retained to form the smallest bounding quadrilateral. After the quantity of mask vertices is simplified, it determines whether the quantity of vertices meets the preset point range (e.g., 20~30 vertices). When the quantity of vertices meets the preset point range, the polygon approximation process is completed; otherwise, the tolerance is adjusted, for example, in a condition that the number of vertices after simplification exceeds the point range, an increment is performed on the tolerance (by 0.1 each time); conversely, when the quantity of vertices is less than the point range, a decrement is performed on the tolerance (by 0.1 each time). Then, the process returns to the step of simplifying the mask vertices based on the adjusted tolerance until the quantity of simplified mask vertices is within the point range.

According to above-mentioned contents, the difference between the present invention and the conventional technology is that, in the present invention, the bilayer convolutional network model models the defect region of the dual in-line package image as the top layer and the bottom layer overlapped with each other, detects the occlusion part and infers the occluded part to output masks and detection boxes; each of the masks and the detection boxes is filtered based on the area size; the soft non-maximum suppression calculation is executed to output the detection box having high confidence and low intersection over union; the polygon approximation process is executed to obtain the simplified polygonal masks; the simplified polygonal masks, the detection box having high confidence and low intersection over union, and the dual in-line package image are displayed. Therefore, the above-mentioned solution of the present invention can solve the conventional problem and achieve the technical effect of improving the flexibility and accuracy of defect inspection.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A dual in-line package defect image post-processing system combining bilayer occlusion perception and soft non-maximum suppression, comprising:

an image sensor, configured to capture an image of a dual in-line package (DIP) component to generate a DIP image;

an occlusion detection module, connected to the image sensor, configured to receive the DIP image, input the dual in-line package image into a bilayer convolutional network model to model a defect region of the dual in-line package image as a top layer and a bottom layer overlapped with each other, wherein the bilayer convolutional network model detects an occlusion part based on the top layer, infers an occluded part based on the bottom layer, and one or more outputs masks and one or more detection boxes;

a filter module, connected to the occlusion detection module, configured to calculate an area of each of the masks and the detection boxes and delete at least one of the masks and the detection boxes having an area not meeting an area filter threshold;

a calculation module, connected to the filter module, configured to execute a soft non-maximum suppression calculation to calculate an intersection over union (IoU) of one of the detection boxes and another of the detection boxes, and smoothly attenuate a confidence of the overlapped one and another of the detection boxes based on the calculated IoU;

an adjusting module, connected to the calculation module, configured to sort the detection boxes based on the confidences, select the detection box having the highest confidence as a basic box, compare the basic box with the remaining detection boxes and calculate the IoUs one by one, dynamically adjust the confidences based on the calculated IoUs, and output the detection box having high confidence and low IoU, wherein the attenuation of the IoU and the confidence are negatively correlated; and an output module, connected to the adjusting module, configured to execute a polygon approximation process on the masks to obtain one or more simplified polygonal masks, and display the simplified polygonal masks, the detection box having high confidence and low intersection over union, and the dual in-line package image.

2. The dual in-line package defect image post-processing system combining bilayer occlusion perception and soft non-maximum suppression according to claim 1, wherein the area filter threshold is set as a pixel value initially and the pixel value is permitted to be dynamically adjusted based on a total quantity of the detection boxes having high confidence and low intersection over union, and the total quantity is positively correlated to the pixel value.

3. The dual in-line package defect image post-processing system combining bilayer occlusion perception and soft non-maximum suppression according to claim 1, wherein the polygon approximation process comprises:

initializing a tolerance, setting a point range, performing an increment on the tolerance when a quantity of polygon vertices of the mask exceeds the point range, and performing a decrement on the tolerance when the quantity of the polygon vertices of the mask does not exceed the point range, wherein after multiple iterations, the simplified polygonal mask whose quantity of polygon vertices is within the point range is generated.

4. The dual in-line package defect image post-processing system combining bilayer occlusion perception and soft non-maximum suppression according to claim 3, wherein the tolerance is set as 0.1 initially, increased by 0.1 for each increment, and decreased by 0.1 for each decrement, and the point range is between 20 and 30.

5. The dual in-line package defect image post-processing system combining bilayer occlusion perception and soft non-maximum suppression according to claim 1, wherein the calculation formula for the confidence is defined as $$\text{score}_j = \text{score}_i \times e^{-\frac{IoU^2}{\sigma}},$$

wherein the $\text{score}_j$ is the adjusted confidence of the detection box, the score is the confidence before adjustment, IoU is the intersection over union of the detection box and the basic box, and $\sigma$ is an adjusting coefficient used to control strength of attenuation.

6. A dual in-line package defect image post-processing method combining bilayer occlusion perception and soft non-maximum suppression, comprising:

receiving a dual in-line package image from an image sensor, and inputting the dual in-line package image into a bilayer convolutional network model to model a defect region of the dual in-line package image as a top layer and a bottom layer overlapped with each other, wherein the bilayer convolutional network model detects an occlusion part based on the top layer, infers an occluded part based on the bottom layer, and outputs masks and detection boxes;

calculating an area of each of the masks and the detection boxes, and deleting one of the masks and the detection boxes that have respective areas not meeting an area filter threshold;

executing a soft non-maximum suppression calculation to calculate an intersection over union (IoU) of one of the detection boxes and another of the detection boxes and smoothly attenuate a confidence of the overlapped one and another of the detection boxes based on the calculated IoU;

sorting the detection boxes based on the confidences, selecting one of the detection boxes having highest confidence as a basic box, comparing the basic box with the remaining detection boxes and calculating the IoUs one by one, dynamically adjusting the confidences based on the calculated IoUs, and outputting the detection box having high confidence and low IoU, wherein attenuation of the IoU and the confidence are negatively correlated; and executing a polygon approximation process on the masks to obtain a simplified polygonal mask, and displaying the simplified polygonal mask, the detection box having high confidence and low intersection over union, and the dual in-line package image.

7. The dual in-line package defect image post-processing method combining bilayer occlusion perception and soft non-maximum suppression according to claim 6, wherein the area filter threshold is set as a pixel value initially and the pixel value is permitted to be dynamically adjusted based on a total quantity of the detection boxes having high confidence and low intersection over union, and the total quantity is positively correlated to the pixel value.

8. The dual in-line package defect image post-processing method combining bilayer occlusion perception and soft non-maximum suppression according to claim 6, wherein the polygon approximation process comprises:

initializing a tolerance, setting a point range, performing an increment on the tolerance when a quantity of polygon vertices of the mask exceeds the point range, and performing a decrement on the tolerance when the quantity of the polygon vertices of the mask does not exceed the point range, wherein after multiple iterations, the simplified polygonal mask whose quantity of polygon vertices is within the point range is generated.

9. The dual in-line package defect image post-processing method combining bilayer occlusion perception and soft non-maximum suppression according to claim 8, wherein the tolerance is set as 0.1 initially, increased by 0.1 for each increment, and decreased by 0.1 for each decrement, and the point range is between 20 and 30.

10. The dual in-line package defect image post-processing method combining bilayer occlusion perception and soft non-maximum suppression according to claim 6, wherein the calculation formula for the confidence is defined as $$\text{score}_j = \text{score}_i \times e^{-\frac{IoU^2}{\sigma}},$$

wherein the $\text{score}_j$ is the adjusted confidence of the detection box, the $\text{score}_i$ is the confidence before adjustment, IoU is the intersection over union of the detection box and basic box, and $\sigma$ is an adjusting coefficient used to control strength of attenuation.

* * * * *